United States Patent
Ran et al.

(10) Patent No.: US 9,565,197 B1
(45) Date of Patent: *Feb. 7, 2017

(54) SECURE VERIFICATION OF WEBSITE CLAIMS

(71) Applicant: INTUIT INC., Mountain View, CA (US)

(72) Inventors: Alexander S. Ran, Palo Alto, CA (US); Christopher Z. Lesner, Palo Alto, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/811,327

(22) Filed: Jul. 28, 2015

Related U.S. Application Data

(63) Continuation of application No. 14/086,052, filed on Nov. 21, 2013, now Pat. No. 9,282,107.

(51) Int. Cl.
*H04L 9/32* (2006.01)
*H04L 29/06* (2006.01)
*G06F 21/64* (2013.01)

(52) U.S. Cl.
CPC .............. *H04L 63/12* (2013.01); *G06F 21/64* (2013.01)

(58) Field of Classification Search
CPC ....................................................... H04L 9/32
See application file for complete search history.

(56) References Cited

U.S. PATENT DOCUMENTS

| | | | |
|---|---|---|---|
| 8,646,072 B1* | 2/2014 | Savant | G06F 21/51 709/229 |
| 2003/0131235 A1* | 7/2003 | Wheeler | G06F 21/32 713/168 |
| 2008/0098229 A1* | 4/2008 | Hartrell | G06F 21/554 713/176 |
| 2010/0100958 A1* | 4/2010 | Jeremiah | G06F 21/36 726/22 |
| 2011/0018692 A1* | 1/2011 | Smith | G06K 7/0008 340/10.4 |

* cited by examiner

*Primary Examiner* — Josnel Jeudy
(74) *Attorney, Agent, or Firm* — Patterson + Sheridan, LLP

(57) ABSTRACT

The disclosed embodiments provide a system that facilitates use of a website. During operation, the system enrolls a claim containing an assertion of a characteristic of the website with a central authority. To enroll the claim, the system obtains the claim from an issuer of the claim and includes a first secure attribute with the claim, wherein the first secure attribute is signed with a first private key of the central authority. Next, the system enables verification of the claim using the first secure attribute and a first public key of the central authority.

20 Claims, 7 Drawing Sheets

SECURE VERIFICATION OF WEBSITE CLAIMS

CROSS REFERENCE TO RELATED APPLICATION

This application is a continuation of, and hereby claims priority under 35 U.S.C. §120 to, U.S. Non-provisional patent application Ser. No. 14/086,052, entitled "Secure Verification of Website claims," by Alexander S. Ran and Christopher Z. Lesner, filed on Nov. 21, 2013, the contents of which are herein incorporated by reference.

BACKGROUND

Related Art

The disclosed embodiments relate to use of websites. More specifically, the disclosed embodiments relate to techniques for performing secure verification of claims associated with websites.

Websites commonly display and/or use claims that assert the trustworthiness, business reliability, security, quality, value, customer service, and/or other characteristics of the websites and/or businesses represented by the websites. For example, an e-commerce website may display a set of trust seals that attest to the website's business reliability, security practices, and/or maintenance of privacy. The trust seals may be granted by reliable third-party sources, such as computer security companies, business verification organizations, and/or dispute resolution organizations. The e-commerce website and/or a different website (e.g., a review site) may also provide a set of testimonials and/or reviews from customers that bolster the website's perceived value, customer service, responsiveness, and/or reputation.

However, claims such as trust seals, reviews, and/or testimonials may be easily cloned and/or faked. For example, a trust seal issued by an organization may be an image that is easily copied and shown on a website that is not certified by the organization. Similarly, testimonials and/or reviews may not be provided by actual users of the website. Instead, positive testimonials and/or reviews of the website may be faked by the website's owners and/or users paid to positively influence user opinion of the website, while negative testimonials and/or reviews of the website may be left by the website's competitors and/or users paid to negatively influence user opinion of the website. Such fraudulent use of claims may reduce the value and/or efficacy of the claims and, in turn, interfere with a consumer's ability to distinguish between a reputable, secure, and/or trustworthy website and a disreputable, insecure, and/or untrustworthy website.

Consequently, user interaction with websites may be facilitated by mechanisms for verifying claims associated with the websites.

SUMMARY

The disclosed embodiments provide a system that facilitates use of a website. During operation, the system enrolls a claim containing an assertion of a characteristic of the website with a central authority. To enroll the claim, the system obtains the claim from an issuer of the claim and includes a first secure attribute with the claim, wherein the first secure attribute is signed with a first private key of the central authority. Next, the system enables verification of the claim using the first secure attribute and a first public key of the central authority.

In some embodiments, the system also provides a usage context associated with display of the claim in the website by including a second secure attribute containing the usage context with the claim, wherein the second secure attribute is signed with a second private key of the issuer. Next, the system enables verification of the claim using the second secure attribute and a second public key of the issuer.

In some embodiments, the first secure attribute includes the second public key and a verification statement for the issuer from the central authority.

In some embodiments, enabling verification of the displayed claim using the first secure attribute and the first public key of the central authority involves enabling verification of the first secure attribute using the first public key.

In some embodiments, enabling verification of the claim using the second secure attribute and the second public key involves enabling verification of the second secure attribute using the second public key.

In some embodiments, the first secure attribute is embedded in the claim or provided separately from the claim.

In some embodiments, the usage context includes a period of validity, a domain name, a uniform resource locator (URL), and/or a position.

In some embodiments, the claim includes a trust seal, a testimonial, a review, an image, text, audio, and/or video.

In some embodiments, the system also performs verification of the displayed claim, and manages use of the website based on the verification.

In some embodiments, performing verification of the displayed claim involves:
 (i) comparing the usage context with one or more attributes associated with display of the claim in the website;
 (ii) successfully verifying the claim if the one or more attributes match the usage context; and
 (iii) failing to verify the claim if the one or more attributes do not match the usage context.

In some embodiments, managing use of the website based on the verification involves identifying the claim as verified or unverified.

BRIEF DESCRIPTION OF THE FIGURES

In the figures, like reference numerals refer to the same figure elements.

DETAILED DESCRIPTION

Figure 1:
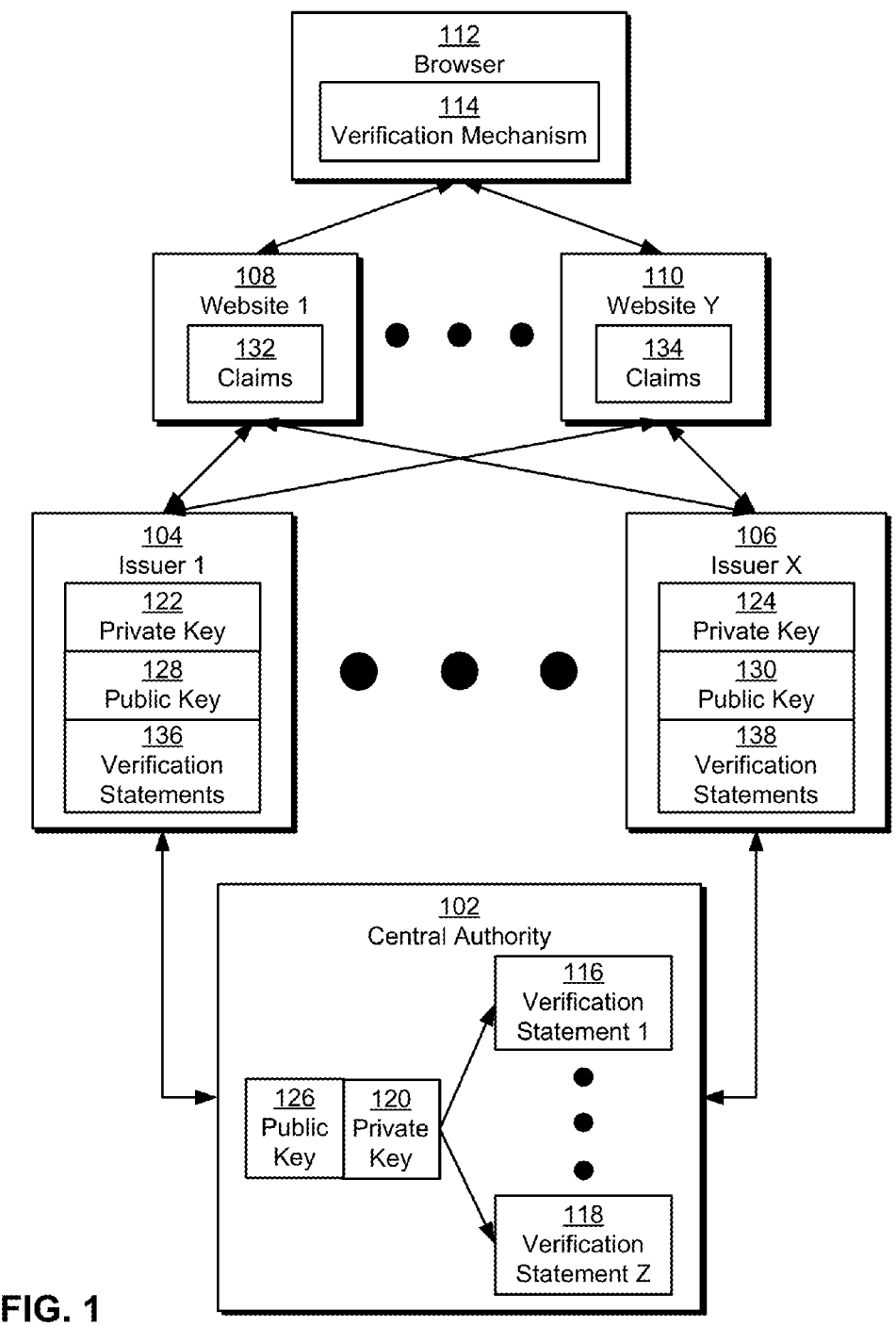
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method and system for facilitating use of a website. More specifically, the disclosed embodiments provide a method and system for securely verifying claims that assert characteristics of the website. For example, the claims may include trust seals, testimonials, and/or reviews that attest to the website's trustworthiness, security, protection of privacy, and/or business reliability. The claims may be provided as images, text, audio, video, and/or other content formats.

To enable verification of a claim, the claim may be associated with one or more secure attributes. Each secure attribute may include a verification statement and/or a usage context for the claim, which may be used to verify the legitimacy of the claim. The secure attribute may also be signed with a private key of a trusted third party such as a central authority or issuer, and a public key of the trusted third party may be used to verify the secure attribute. The secure attribute may then be embedded in the claim or provided separately from the claim for subsequent verification by a browser.

As shown in FIG. 1, a browser 112 may be used to view and/or interact with a set of websites (e.g., website 1 108, website y 110), each of which is associated with a set of claims 132-134. For example, each website may include and/or be associated with one or more trust seals, testimonials, and/or reviews that verify and/or support the perceived security, trustworthiness, privacy, and/or reliability of the website. The trust seals may be images that are provided by trusted third-party issuers (e.g., issuer 1 104, issuer x 106) such as business-verification organizations, dispute-resolution organizations, and/or computer security organizations. The testimonials and/or reviews may include text, audio, and/or video submitted by customers and/or other users who have purchased goods or services from the website and/or otherwise interacted with the website. The testimonials and/or reviews may be displayed within the website and/or in other websites such as review sites to encourage use of the website by the users.

Those skilled in the art will appreciate that claims 132-134 may be easy to forge and/or fake and difficult to verify. For example, a trust seal may be an image that is easily copied and shown on a website without certifying the website with the organization issuing the trust seal. In addition, users visiting the website may not have a simple way to authenticate the trust seal. Instead, the users may verify the legitimacy of the trust seal by navigating to a webpage of the trust seal's issuer using a hyperlink that is provided with the trust seal. Moreover, the contents of the webpage may vary across trust seal issuers and lack standardization, which in turn may prevent automated verification of the trust seals by browser 112. If the website contains multiple trust seals, the users may be required to independently verify each trust seal with the trust seal's issuer to confirm the validity of claims (e.g., claims 132-134) associated with the trust seals. Consequently, verification of trust seals may be tedious and/or confusing to the users.

Along the same lines, testimonials and/or reviews associated with the website may not be submitted by actual customers and/or users of the website. Instead, positive testimonials and/or reviews may be generated by the website's owners and/or users who are paid to provide positive opinions of the website, while negative testimonials and/or reviews may be submitted by the website's competitors and/or users paid by the competitors to leave negative opinions of the website. The website and/or other websites in which the testimonials and/or reviews are shown may further lack mechanisms for verifying the authenticity of the testimonials and/or reviews.

In turn, the ease with which claims 132-134 may be falsified may reduce the value and/or efficacy of claims 132-134. For example, forged trust seals, testimonials, and/or reviews on a website may mislead a user into believing that the website is reputable and/or trustworthy. Conversely, another user may only interact and/or make purchases with large, well-known websites because the user does not trust claims 132-134 associated with smaller websites, even if the claims are legitimate.

In one or more embodiments, the system of FIG. 1 includes functionality to perform secure verification of claims 132-134 in websites accessed by browser 112. As described in further detail below, such verification may be performed by browser 112, issuers (e.g., issuer 1 104, issuer x 106) of claims 132-134, and a central authority 102 that certifies verification statements 136-138 and/or claims 132-134 from the issuers.

Central authority 102 may be a trusted third party that enrolls claims 132-134 from issuers (e.g., issuer 1 104, issuer x 106) of claims 132-134. During enrollment of a claim, central authority 102 may obtain the claim and a public key (e.g., public keys 128-130) of the claim's issuer. Central authority 102 may validate the uniqueness of the claim by comparing the claim with other claims enrolled with central authority 102. Central authority 102 may also verify the issuer's legitimacy and/or ownership of the claim by, for example, performing a background check on the issuer and/or identifying any trademarks, copyrights, and/or other rights associated with the claim. In other words, central authority 102 may verify the credentials of the issuer in certifying websites using the claim.

Next, central authority 102 may provide a verification statement (e.g., verification statement 1 116, verification statement z 118) for the claim and sign the verification statement and the issuer's public key with a private key 120 of central authority 102. The verification statement may verify the issuer's ownership of and/or right to issue the claim. For example, the verification statement may include the name of the issuer, a name and/or other identifier for the claim, the issuer's public key, and/or a period of validity associated with issuance of the claim by the issuer. Moreover, a different verification statement may be created for each claim enrolled with central authority 102 to allow the claims to be distinguished and/or managed separately from one another.

By signing the verification statement and the issuer's public key with private key 120, central authority 102 may generate a digital certificate that certifies ownership of the public key and the claim by the issuer. Central authority 102 may include the digital certificate as a first secure attribute with the claim for subsequent use by the issuer. For example, central authority 102 may embed and/or encode the first secure attribute as an image attribute, watermark, barcode, and/or other data within a file containing the claim. Conversely, central authority 102 may provide the first secure attribute as a HyperText Markup Language (HTML) tag and/or other metadata that is separate from the claim.

The issuer may receive the signed claim from central authority 102 and configure the claim for use with one or more websites (e.g., website 1 108, website y 110) that are certified by the issuer. In particular, the issuer may generate a set of verification statements 136-138 for the claim, with each verification statement containing a usage context associated with displaying the claim on a particular website. For example, the usage context may include a period of validity, a domain name and/or uniform resource locator (URL) associated with the website, and/or a position of the claim in the website (e.g., top, bottom, side, adjacent to other elements in the website, etc.).

After generating the verification statement and/or usage context for the website, the issuer may create a second secure attribute by signing the verification statement and/or usage context with a private key (e.g., private keys 122-124) of the issuer. The issuer may then include the second secure attribute with the claim before providing the claim to the website. As with the first secure attribute, the second secure attribute may be embedded in the claim or provided separately from the claim. The secured claim may then be displayed within the website according to the usage context.

During use of a website with a secure claim, a verification mechanism 114 in browser 112 may verify the claim using the first and second secure attributes. First, verification mechanism 114 may verify the first secure attribute using a public key 126 of central authority 102. Public key 126 may be provided by central authority 102 and stored by browser 112 and/or verification mechanism 114 for use in verifying claims 132-134 on websites. After verifying the first secure attribute, verification mechanism 114 may obtain the public key (e.g., public keys 128-130) of the claim's issuer and the verification statement (e.g., verification statement 1 116, verification statement z 118) for the issuer from central authority 102.

Next, verification mechanism 114 may use the issuer's public key to verify the second secure attribute and obtain the verification statement for the website, which includes the usage context for the claim in the website. Verification mechanism 114 may then perform verification of the claim by comparing the usage context with one or more attributes (e.g., domain name, URL, current time, position) associated with display of the claim in the website. More specifically, verification mechanism 114 may successfully verify the claim if the attribute(s) match the usage context and fail to verify the claim if the attribute(s) do not match the usage context. Secure verification of claims is described in further detail below with respect to FIG. 2.

Verification mechanism 114 may also manage use of the website from browser 112 based on the successful or failed verification of the claim. For example, verification mechanism 114 may identify the claim as verified or unverified to a user of browser 112, as described in further detail below with respect to FIGS. 3A-3B. Verification mechanism 114 may also generate an alert and/or prompt the user to confirm continued use of the website if the claim is unverified.

By enabling, performing, standardizing, and automating the secure verification of claims 132-134, the system of FIG. 1 may increase the value and/or effectiveness of claims 132-134 to users interacting with websites (e.g., website 1 108, website y 110) legitimately associated with claims 132-134 while preventing fraudulent use of claims 132-134 by other websites. Moreover, central authority 102 may further ensure that secure claims 132-134 are issued by legitimate and/or reputable issuers and avert the need to store public keys 128-130 for all trusted issuers in browser 112.

Figure 2:
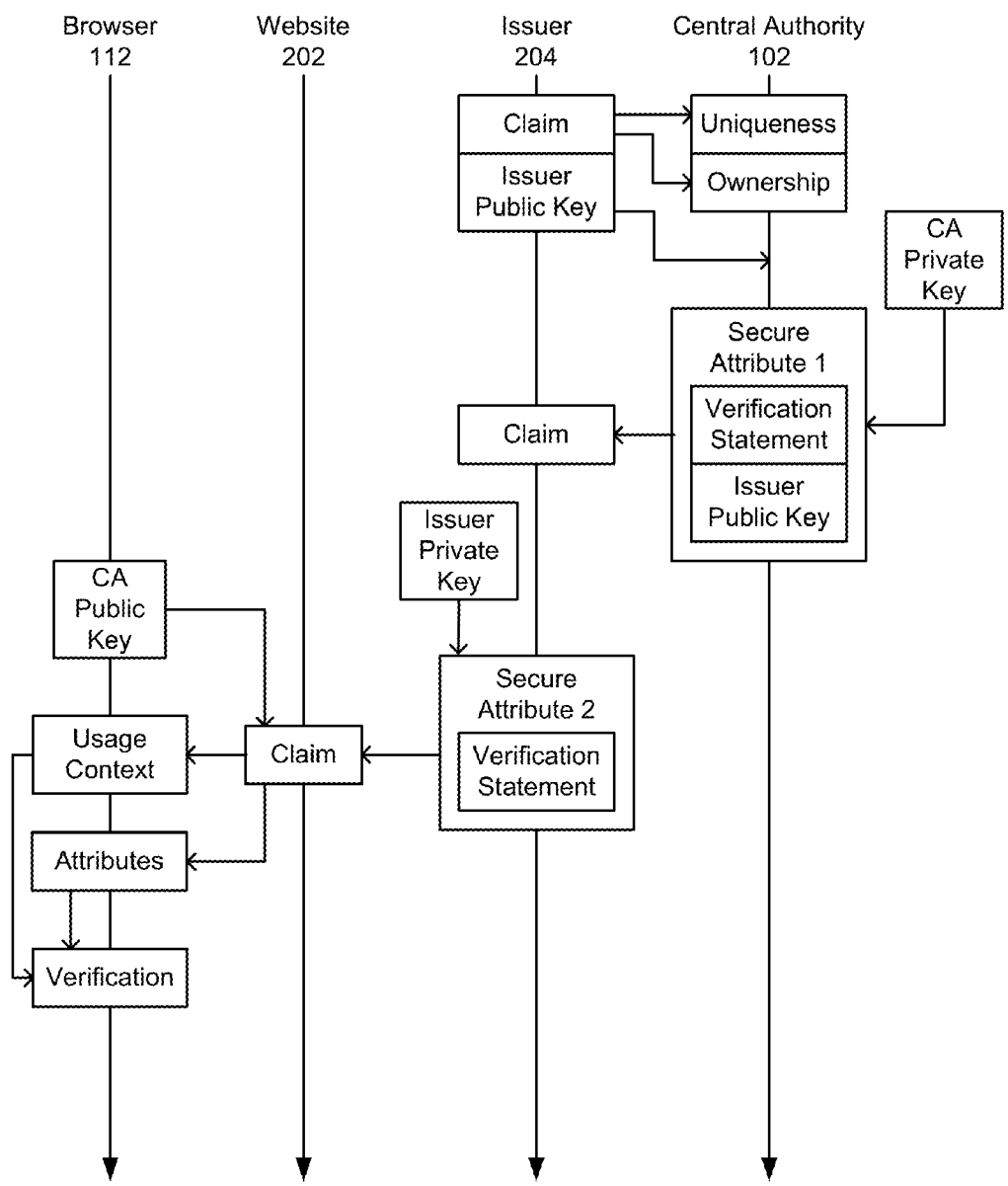
FIG. 2 shows the securing of a claim containing an assertion of a characteristic of a website in accordance with the disclosed embodiments.

FIG. 2 shows the securing of a claim containing an assertion of a characteristic of a website 202 in accordance with the disclosed embodiments. As shown in FIG. 2, an issuer 204 of the claim may enroll the claim with central authority 102 by providing the claim and a public key of issuer 204 (e.g., "Issuer Public Key") to central authority 102. Prior to enrolling the claim, central authority 102 may verify the uniqueness of the claim and ownership of the claim by issuer 204. For example, central authority 102 may ensure that the claim is unique by comparing the claim with other claims (e.g., trust seals, testimonials, reviews, etc.) enrolled with central authority 102. Similarly, central authority 102 may determine ownership of the claim by issuer 204 by examining copyrights, trademarks, and/or other rights associated with the claim.

Next, central authority 102 may generate a first secure attribute (e.g., "Secure Attribute 1") that includes a verification statement for issuer 204 and the public key of issuer 204. The verification statement for issuer 204 may certify the legitimacy of issuer 204 and/or the ownership of the claim by issuer 204. For example, the verification statement for issuer 204 may include the name of issuer 204, a name of the claim, the public key of issuer 204, and/or one or more timestamps denoting a period of validity associated with issuance of the claim by issuer 204. The first secure attribute may also be signed with the central authority's private key (e.g., "CA Private Key").

Central authority 102 may provide the first secure attribute to issuer 204, and central authority 102 and/or issuer 204 may include the first secure attribute with the claim. For example, central authority 102 and/or issuer 204 may embed the first secure attribute as a watermark, barcode border image, Exchangeable image file format (Exif) data, and/or other data in an image representing the claim. Alternatively, central authority 102 and/or issuer 204 may provide the first secure attribute as an HTML tag and/or other metadata that is separate from the claim.

After receiving the claim and/or first secure attribute from central authority 102, issuer 204 may generate a second secure attribute (e.g., "Secure Attribute 2") that includes a verification statement for website 202 from issuer 204. The verification statement for website 202 may include a usage context associated with the claim. For example, the usage context may include one or more timestamps that specify a period of validity of the claim in website 202, a domain name and/or URL prefix associated with website 202, and/or one or more descriptors of the position of the claim in website 202 (e.g., top, bottom, left, right, components adjacent to the claim, etc.). The second secure attribute may also be signed with the private key of issuer 204 (e.g., "Issuer Private Key").

Issuer 204 may include the second secure attribute with the claim by embedding the second secure attribute in the claim or providing the second secure attribute separately from the claim. Issuer 204 may then provide the claim, the first secure attribute, and the second secure attribute to website 202, and website 202 may display the claim according to the usage context in the second secure attribute.

During use of website 202, browser 112 may perform verification of the claim using the first and second secure attributes. First, browser 112 may use a public key of central authority 102 (e.g., "CA Public Key") to verify the first secure attribute and obtain the verification statement for issuer 204 and the issuer's public key. Because central authority 102 may represent a trusted third party that certifies ownership of the claim and the issuer public key by issuer 204, the public key of central authority 102 may be stored in browser 112 and/or otherwise accessed by browser 112 for use in verifying claims on website 202 and/or other websites from issuer 204 and/or other issuers. After the first secure attribute is verified, browser 112 may use the verification statement for issuer 204 to verify the legitimacy of issuer 204 in issuing the claim.

Next, browser 112 may use the public key of issuer 204 from the first secure attribute to verify the second secure attribute and obtain the verification statement for website 202. As mentioned above, the verification statement for website 202 may provide a usage context for displaying the claim in website 202. Browser 112 may verify the claim by comparing the usage context with one or more attributes associated with display of the claim in the website. If the attributes match the usage context, browser 112 may successfully verify the claim. On the other hand, browser 112 may fail to verify the claim if the attributes do not match the usage context. For example, browser 112 may fail to verify the claim if the claim's period of validity has lapsed, the usage context includes a domain name and/or URL prefix that does not match that of website 202, and/or the claim is not located in an area of website 202 that corresponds to the position described in the usage context.

Browser 112 may also manage use of website 202 based on the verification. For example, browser 112 may identify the claim as verified or unverified within website 202. Browser 112 may also generate an alert or warning for any unverified and/or invalid claims in website 202, thus mitigating issues associated with fraudulent use of claims by website 202.

Figure 3A:
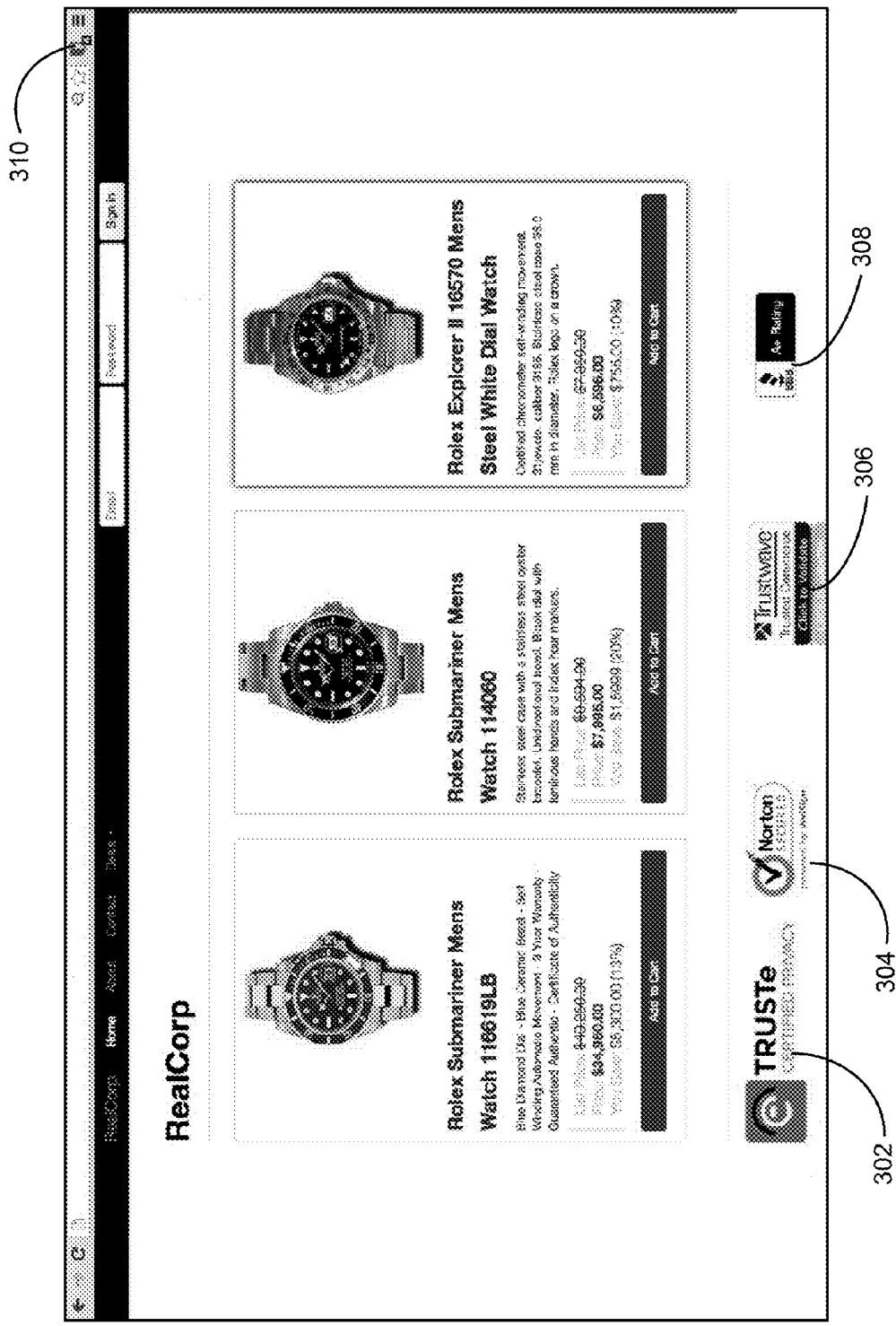
FIG. 3A shows an exemplary screenshot in accordance with the disclosed embodiments.

FIG. 3A shows an exemplary screenshot in accordance with the disclosed embodiments. More specifically, FIG. 3A shows a screenshot of a website displayed through a browser, such as browser 112 of FIG. 1. The website includes a set of claims 302-308 that represent assertions of characteristics of the website. For example, claims 302-308 may be trust seals that certify the website's business reliability, maintenance of privacy, security, and/or business identity. claims 302-308 may thus encourage a user of the browser to purchase goods or services and/or otherwise interact with the website.

To facilitate use of the website by the user, the browser may include a verification mechanism 310 that may be activated by the user. For example, the user may activate verification mechanism 310 by selecting verification mechanism 310 using a cursor, touch-sensitive display, keyboard, and/or other input mechanism. Verification mechanism 310 may then perform verification of claims 302-308 without requiring the user to navigate away from the website and/or independently confirm the validity of claims 302-308 with multiple issuers of claims 302-308, as described in further detail below with respect to FIG. 3B.

Figure 3B:
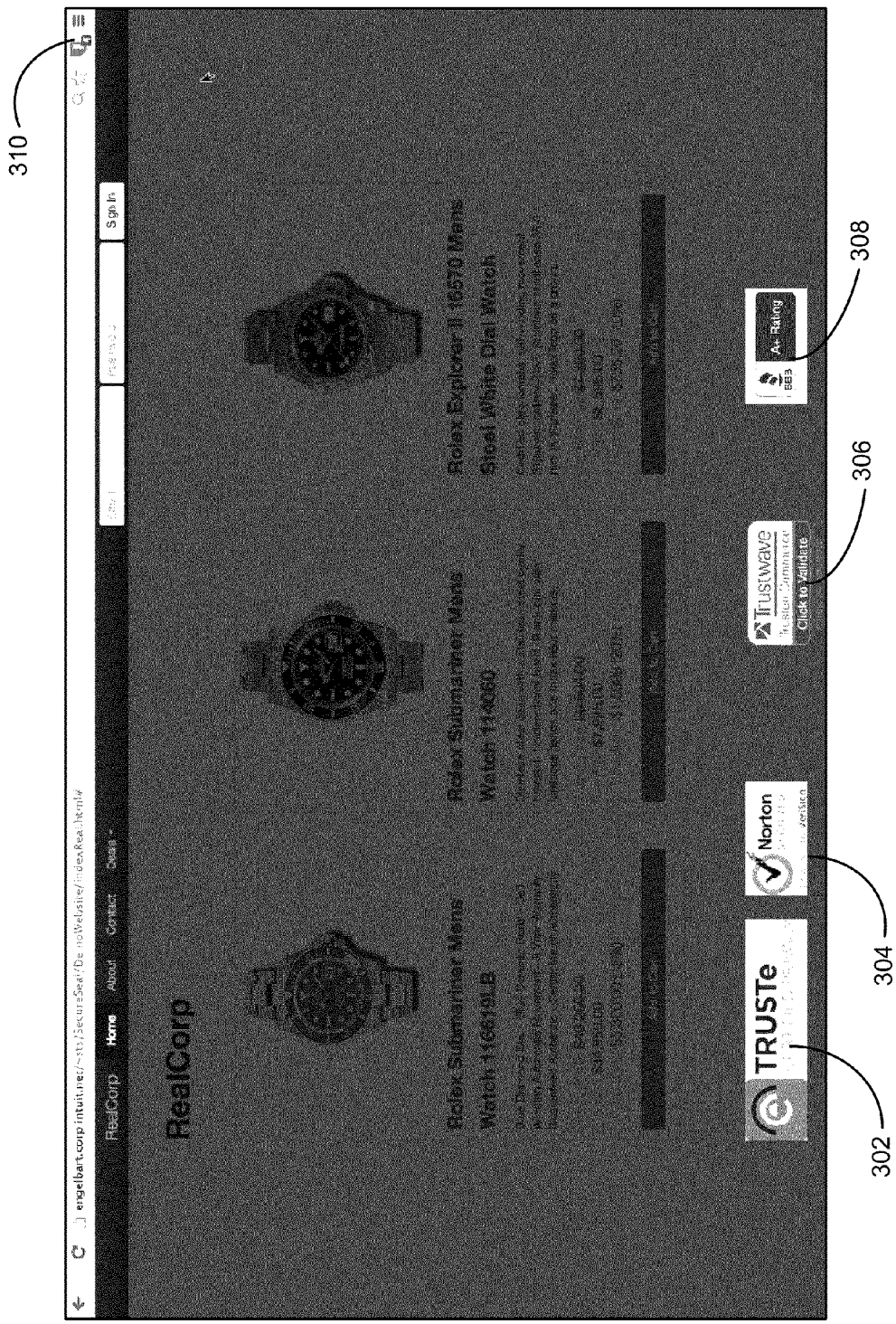
FIG. 3B shows an exemplary screenshot in accordance with the disclosed embodiments.

FIG. 3B shows an exemplary screenshot in accordance with the disclosed embodiments. More specifically, FIG. 3B shows a screenshot of the web browser of FIG. 3A after verification mechanism 310 has been activated. As shown in FIG. 3B, claims 302-308 are highlighted, while the rest of the website is dimmed. Such highlighting of claims 302-308 may indicate that claims 302-308 are valid. For example, claims 302-308 may be highlighted if secure attributes associated with claims 302-308 are verified and/or claims 302-308 adhere to the usage contexts and/or verification statements included in the secure attributes.

On the other hand, one or more claims 302-308 may be dimmed if the claim(s) are not accompanied by secure attributes, which in turn may indicate that the claims(s) are invalid. Finally, one or more claims 302-308 may be flagged if the claim(s) do not adhere to the usage contexts and/or verification statements in the corresponding secure attribute(s). For example, a claim that is expired and/or associated with a different domain name or URL prefix than that of the website may be displayed in red to alert the user of the claim's lack of validity. The browser may also display a warning and/or alert for the invalid claim and prompt the user for confirmation to proceed with continued use of the website before returning to a normal (e.g., undimmed) view of the website.

Figure 4:
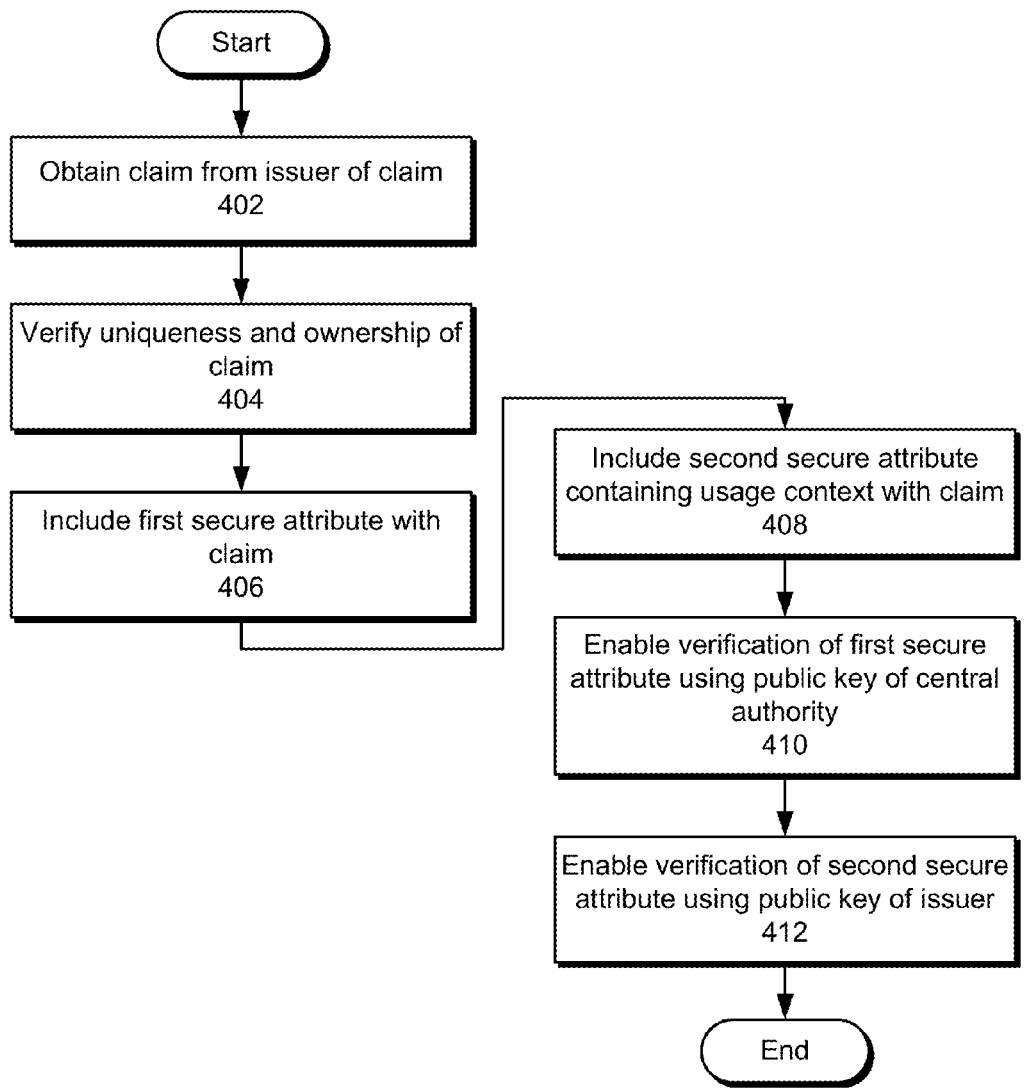
FIG. 4 shows a flowchart illustrating the process of facilitating use of a website in accordance with the disclosed embodiments.

FIG. 4 shows a flowchart illustrating the process of facilitating use of a website in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, a claim containing an assertion of a characteristic (e.g., trustworthiness, security, business reliability, quality, value, etc.) of a website is enrolled with a central authority. The claim may be a trust seal, testimonial, and/or review and be provided as an image, text, audio, and/or video. The claim is obtained from an issuer of the claim (operation 402), and the uniqueness and ownership of the claim are verified (operation 404). For example, a background check may be performed to verify the legitimacy of the claim's issuer, and the claim's uniqueness may be verified by comparing the claim with other claims enrolled with the central authority. The issuer's ownership of the claim may also be verified using copyrights, trademarks, and/or other rights associated with the claim.

Next, a first secure attribute is included with the claim (operation 406). The first secure attribute may include a verification statement for the issuer from the central authority. For example, the verification statement for the issuer may include details for certifying issuance of the claim by the issuer, such as the name of the issuer, the name of the claim, and/or a period of validity associated with issuance of the claim by the issuer. The first secure attribute may also include a public key of the issuer, which may be provided by the issuer along with the claim during enrollment of the claim. Finally, the first secure attribute may be signed with a private key of the central authority.

A usage context associated with display of the claim in the website is also provided by including a second secure attribute containing the usage context with the claim (operation 408). The usage context may include a period of validity of the claim, a domain name and/or URL of the website within which the claim may be validly displayed, and/or a position of the claim within the website. The second secure attribute may be signed with a private key of the issuer. As a result, the first secure attribute may be provided by the central authority and used to verify issuance of the claim by the issuer, and the second secure attribute may be provided by the issuer and used to verify use of the claim by the website. The first and/or second secure attributes may be embedded in the claim or provided separately from the claim.

Finally, verification of the claim using the first secure attribute and the public key of the central authority is enabled by enabling verification of the first secure attribute using the public key of the central authority (operation 410). The public key may be stored in and/or otherwise available to a browser performing the verification. Verification of the claim using the second secure attribute and the public key of the issuer may also be enabled by enabling verification of the second secure attribute using the public key of the issuer (operation 412), which may be obtained from the first secure attribute. Verification of claims in websites is discussed in further detail below with respect to FIG. 5.

Figure 5:
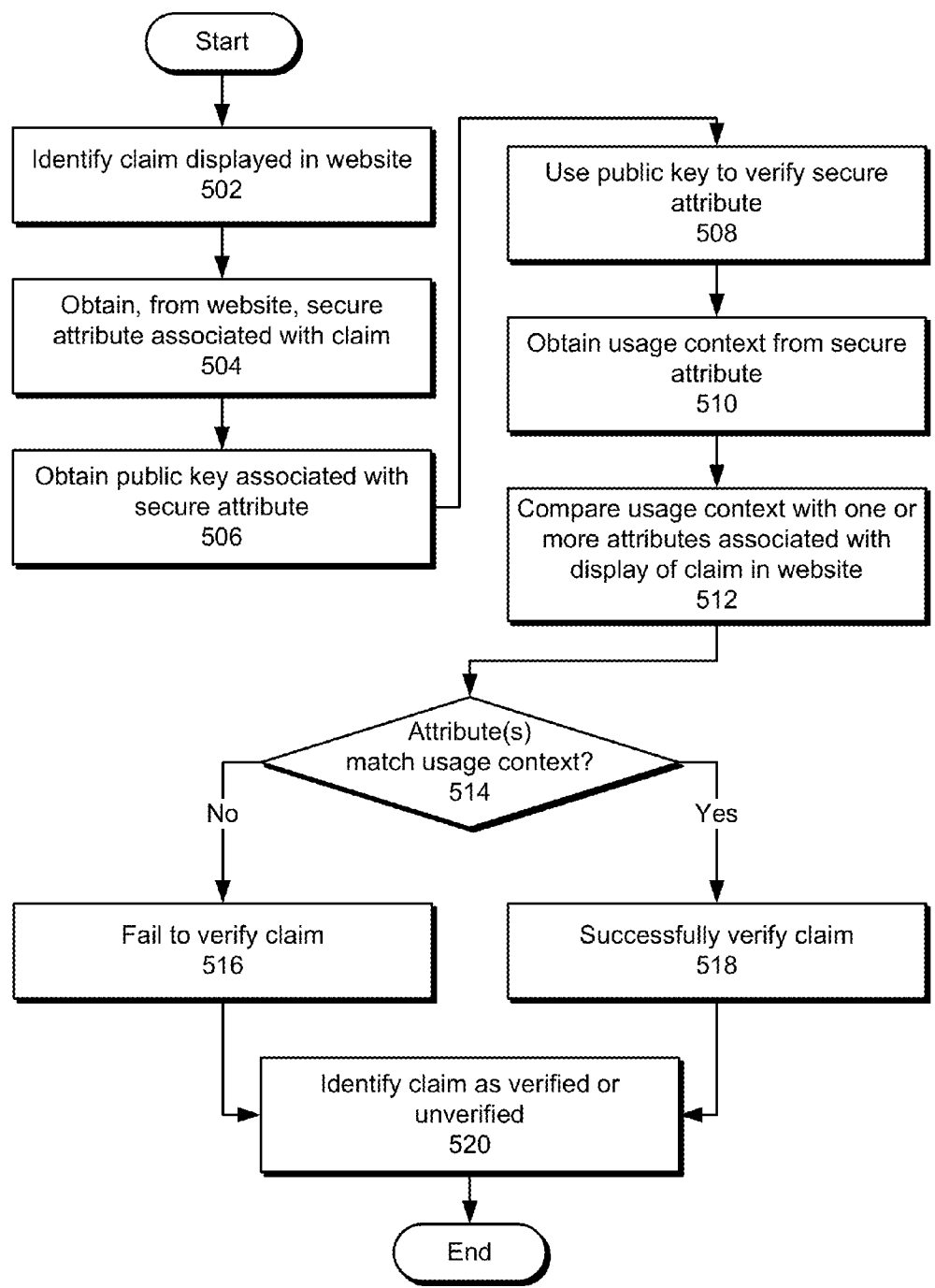
FIG. 5 shows a flowchart illustrating the process of using a website in accordance with the disclosed embodiments.

FIG. 5 shows a flowchart illustrating the process of using a website in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

First, a claim displayed in the website is identified (operation 502). The claim may be identified by a secure attribute associated with the claim, which is obtained from the website (operation 504). Alternatively, the secure attribute may not be required to identify the claim. For example, the claim may be identified by comparing an image, text, audio, video, and/or other data associated with the claim to data for a set of known claims.

Next, the secure attribute is used to perform verification of the claim. In particular, a public key associated with the secure attribute is obtained (operation 506) and used to verify the secure attribute (operation 508). For example, the public key may be obtained from another secure attribute associated with the claim, which may be provided by a central authority that certifies an issuer of the claim as the owner of the public key. The public key may then be used to verify a digital signature associated with the secure attribute, which may be generated using the private key of the issuer.

After the secure attribute is verified, a usage context is obtained from the secure attribute (operation 510) and compared with one or more attributes associated with display of the claim in the website (operation 512). The claim may then be verified based on a match between the attribute(s) and the usage context (operation 514). If the attribute(s) do not match the usage context, verification of the claim may fail (operation 516). If the attribute(s) match the usage context, verification of the claim may be successful (operation 518).

Finally, use of the website is managed based on the verification by identifying the claim as verified or unverified (operation 520). For example, the claim may be highlighted if the claim is verified, while the claim may be dimmed and/or shown in a different color if the claim is unverified and/or invalid. An alert and/or warning may also be displayed if the claim is unverified and/or invalid.

Figure 6:
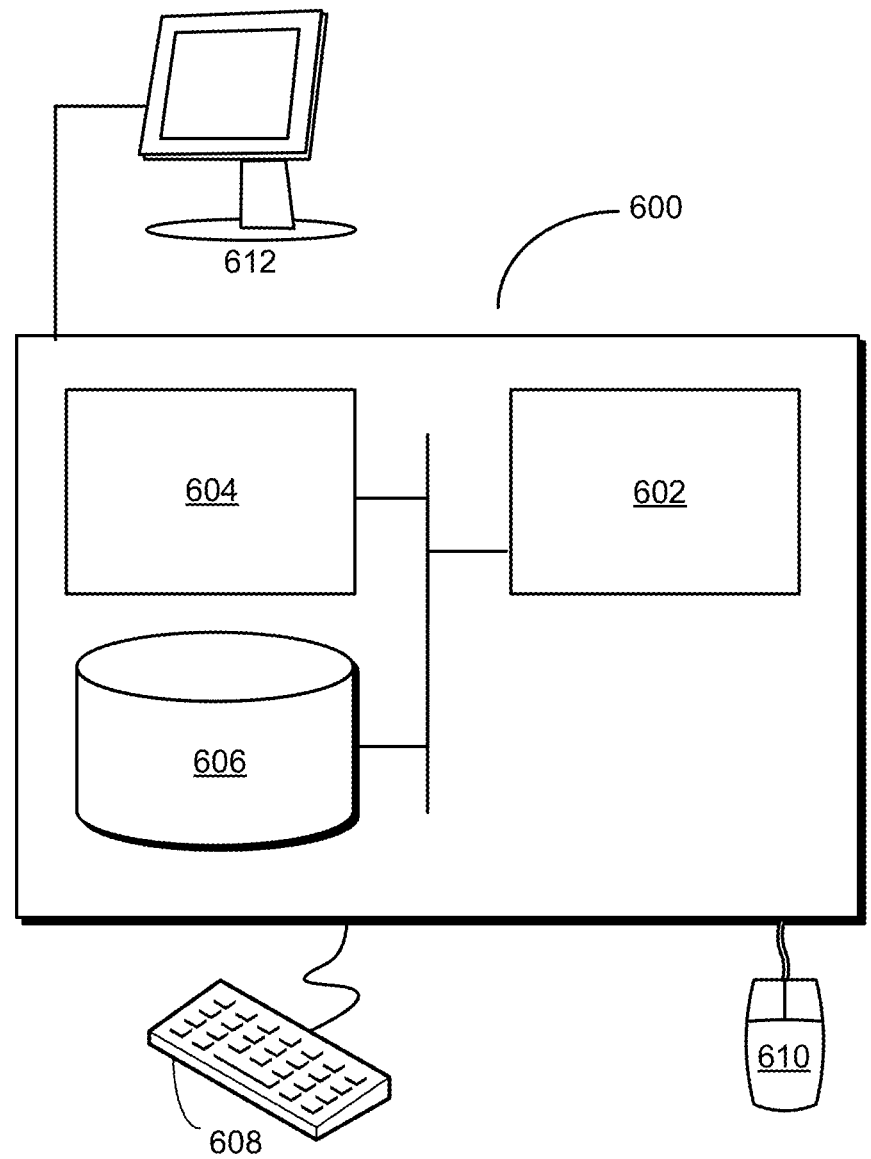
FIG. 6 shows a computer system in accordance with the disclosed embodiments.

FIG. 6 shows a computer system 600 in accordance with an embodiment. Computer system 600 may correspond to an apparatus that includes a processor 602, memory 604, storage 606, and/or other components found in electronic computer systems. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, FIG. 6 provides a system for facilitating use of a website. The system may include a central authority that enrolls a claim containing an assertion of a characteristic of the website by obtaining the claim from an issuer of the claim and including a first secure attribute signed with a first private key of the central authority with the claim. The central authority may also enable verification of the displayed claim using the first secure attribute and a first public key of the central authority. The system may also include an issuer of the claim that provides a usage context associated with display of the claim in the website by including a second secure attribute containing the usage context with the claim. The second secure attribute may also be signed with a second private key of the issuer. The issuer may further enable verification of the claim using the second secure attribute and a second public key of the issuer. Finally, the system may include a browser that performs verification of the displayed claim and manages use of the website based on the verification.

In addition, one or more components of computer system 600 may be remotely located and connected to the other components over a network. Portions of the present embodiments (e.g., central authority, issuer, browser, etc.) may also be located on different nodes of a distributed system that implements the embodiments. For example, the present embodiments may be implemented using a cloud computing system that enables secure verification of claims on a set of websites by a set of remote browsers.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating secure use of a website, comprising:
   verifying, by a verification mechanism in a browser used to access the website, a claim comprising an assertion of a characteristic of the website by verifying a secure attribute generated by a central authority and provided to the website by an issuer of the claim with a public key of the central authority;
   identifying a verification status of the claim as verified or unverified; and
   modifying a User Interface (UI) of the website based on the verification status of the claim.

2. The computer-implemented method of claim 1, wherein modifying the UI of the website involves:
   highlighting, within the UI, claims that are verified; and
   dimming, within the UI, claims that are unverified.

3. The computer-implemented method of claim 1, wherein modifying the UI of the website involves configuring the UI to issue a warning if a user selects a claim that is unverified.

4. The computer-implemented method of claim 1, wherein modifying the UI of the website involves configuring the UI to require a confirmation from a user if the user selects a claim that is unverified.

5. The computer-implemented method of claim 1, wherein modifying the UI of the website involves configuring the UI to not allow the user to select a claim that is unverified.

6. The computer-implemented method of claim 1, wherein selection of a claim that is unverified initiates a re-verification of the claim.

7. The computer-implemented method of claim 1, wherein the claim has an expiration time, and wherein the claim will revert to a verification status of unverified if the claim has not been re-verified by the expiration time.

8. A non-transitory computer-readable storage medium storing instructions that when executed by a computer cause the computer to perform a method for facilitating secure use of a website, the method comprising:
   verifying, by a verification mechanism in a browser used to access the website, a claim comprising an assertion of a characteristic of the website by verifying a secure attribute generated by a central authority and provided to the website by an issuer of the claim with a public key of the central authority;
   identifying a verification status of the claim as verified or unverified; and
   modifying a User Interface (UI) of the website based on the verification status of the claim.

9. The non-transitory computer-readable storage medium of claim 8, wherein modifying the UI of the website involves:
   highlighting, within the UI, claims that are verified; and
   dimming, within the UI, claims that are unverified.

10. The non-transitory computer-readable storage medium of claim 8, wherein modifying the UI of the website involves configuring the UI to issue a warning if a user selects a claim that is unverified.

11. The non-transitory computer-readable storage medium of claim 8, wherein modifying the UI of the website involves configuring the UI to require a confirmation from a user if the user selects a claim that is unverified.

12. The non-transitory computer-readable storage medium of claim 8, wherein modifying the UI of the website involves configuring the UI to not allow the user to select a claim that is unverified.

13. The non-transitory computer-readable storage medium of claim 8, wherein selection of a claim that is unverified initiates a re-verification of the claim.

14. The non-transitory computer-readable storage medium of claim 8, wherein the claim has an expiration time, and wherein the claim will revert to a verification status of unverified if the claim has not been re-verified by the expiration time.

15. A system for facilitating secure use of a website, comprising:
   a memory;
   a processor;
   a non-transitory computer-readable storage medium storing instructions that when executed by the processor cause the system to perform a method for facilitating secure use of a website, the method comprising:
      verifying, by a verification mechanism in a browser used to access the website, a claim comprising an assertion of a characteristic of the website verifying a secure attribute generated by a central authority and provided to the website by an issuer of the claim with a public key of the central authority;
      identifying a verification status of the claim as verified or unverified; and
      modifying a User Interface (UI) of the website based on the verification status of the claim.

16. The system of claim 15, wherein modifying the UI of the website involves:
   highlighting, within the UI, claims that are verified; and
   dimming, within the UI, claims that are unverified.

17. The system of claim 15, wherein modifying the UI of the website involves configuring the UI to issue a warning if a user selects a claim that is unverified.

18. The system of claim 15, wherein modifying the UI of the website involves configuring the UI to require a confirmation from a user if the user selects a claim that is unverified.

19. The system of claim 15, wherein modifying the UI of the website involves configuring the UI to not allow the user to select a claim that is unverified.

20. The system of claim 15, wherein selection of a claim that is unverified initiates a re-verification of the claim.

* * * * *